US007132945B2

(12) United States Patent
Dunlap, Jr.

(10) Patent No.: US 7,132,945 B2
(45) Date of Patent: Nov. 7, 2006

(54) MATERIAL SUPPORT SYSTEM FOR SUPPORTING ITEMS HAVING RADIO FREQUENCY IDENTIFICATION (RFID) TAGS

(75) Inventor: Joe D. Dunlap, Jr., Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 96 days.

(21) Appl. No.: 10/711,086

(22) Filed: Aug. 20, 2004

(65) Prior Publication Data

US 2005/0043854 A1 Feb. 24, 2005

Related U.S. Application Data

(60) Provisional application No. 60/496,975, filed on Aug. 20, 2003.

(51) Int. Cl.
*G08B 13/14* (2006.01)
(52) U.S. Cl. .............................. 340/572.1; 340/572.7; 340/10.1
(58) Field of Classification Search ............. 340/572.1, 340/572.4, 572.7, 568.1, 10.1
See application file for complete search history.

(56) References Cited

U.S. PATENT DOCUMENTS

| 5,260,694 A | * | 11/1993 | Remahl ..................... 340/674 |
| 6,166,638 A | * | 12/2000 | Brady et al. ............. 340/572.7 |
| 6,232,870 B1 | * | 5/2001 | Garber et al. ............. 340/10.1 |
| 6,335,686 B1 | * | 1/2002 | Goff et al. ............... 340/572.4 |
| 6,392,544 B1 | * | 5/2002 | Collins et al. ........... 340/572.7 |
| 6,486,780 B1 | * | 11/2002 | Garber et al. ............ 340/572.1 |
| 6,552,663 B1 | * | 4/2003 | Swartzel et al. ......... 340/572.1 |
| 6,927,692 B1 | * | 8/2005 | Petrinovic ................ 340/572.1 |
| 6,933,849 B1 | * | 8/2005 | Sawyer .................... 340/572.4 |
| 6,956,538 B1 | * | 10/2005 | Moore ........................ 343/878 |
| 6,982,649 B1 | * | 1/2006 | Blum et al. .............. 340/815.4 |

* cited by examiner

*Primary Examiner*—John Tweel, Jr.
(74) *Attorney, Agent, or Firm*—Van Dyke, Gardner, Linn & Burkhart, LLP

(57) ABSTRACT

The present invention provides a unique material support system which is capable of scanning RFID tags of a large number of items in the material support system in an automated manner. A material support system is provided for supporting items having RFID tags placed on the items. At least one item support is provided. Each of the at least one item support is adapted to support a horizontal row of items. At least one radio frequency antenna is positioned adjacent the at least one item support. An antenna support system is provided. The antenna support system transports the at least one radio frequency antenna along the horizontal row of items at the at least one item support.

16 Claims, 3 Drawing Sheets

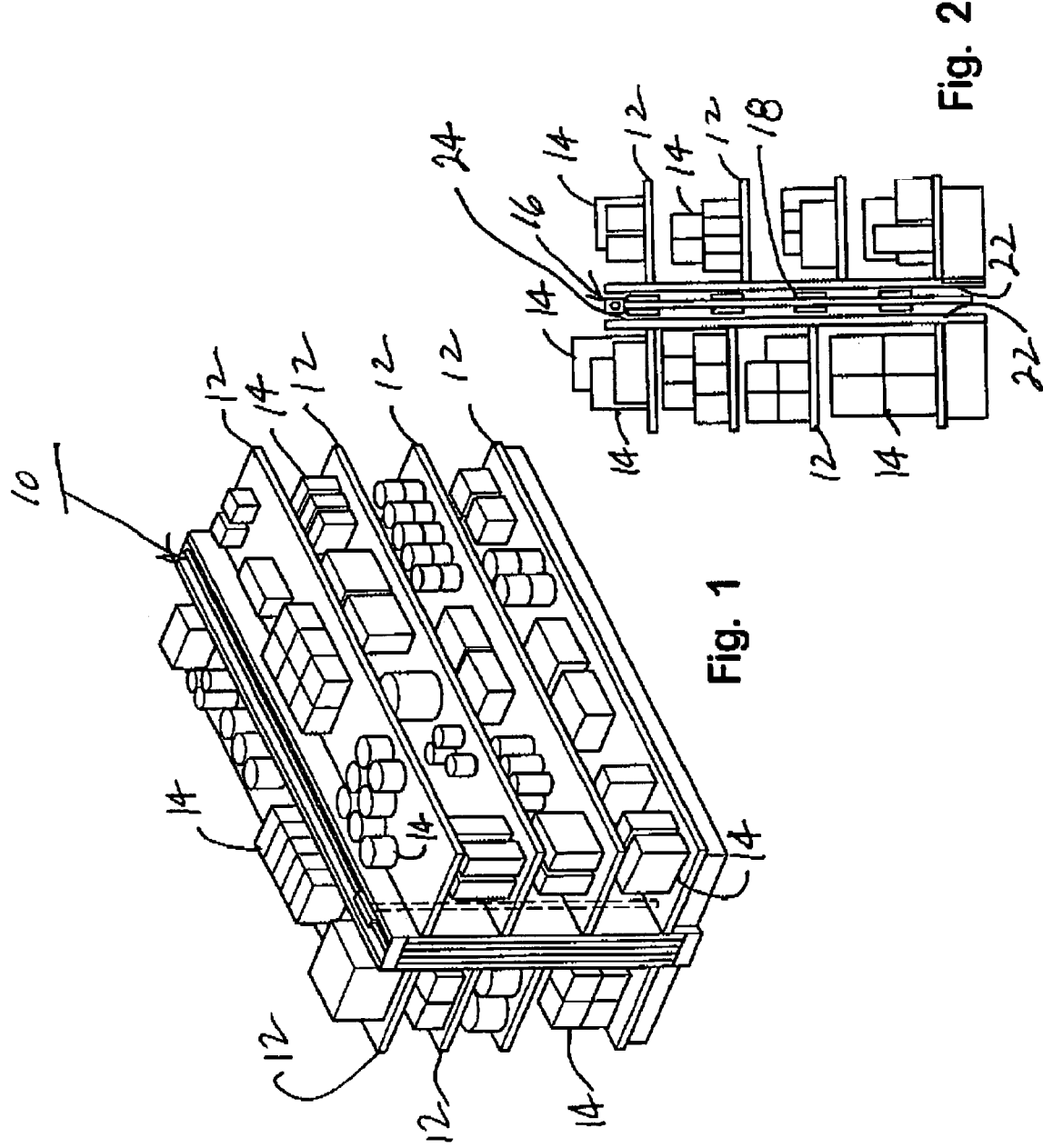

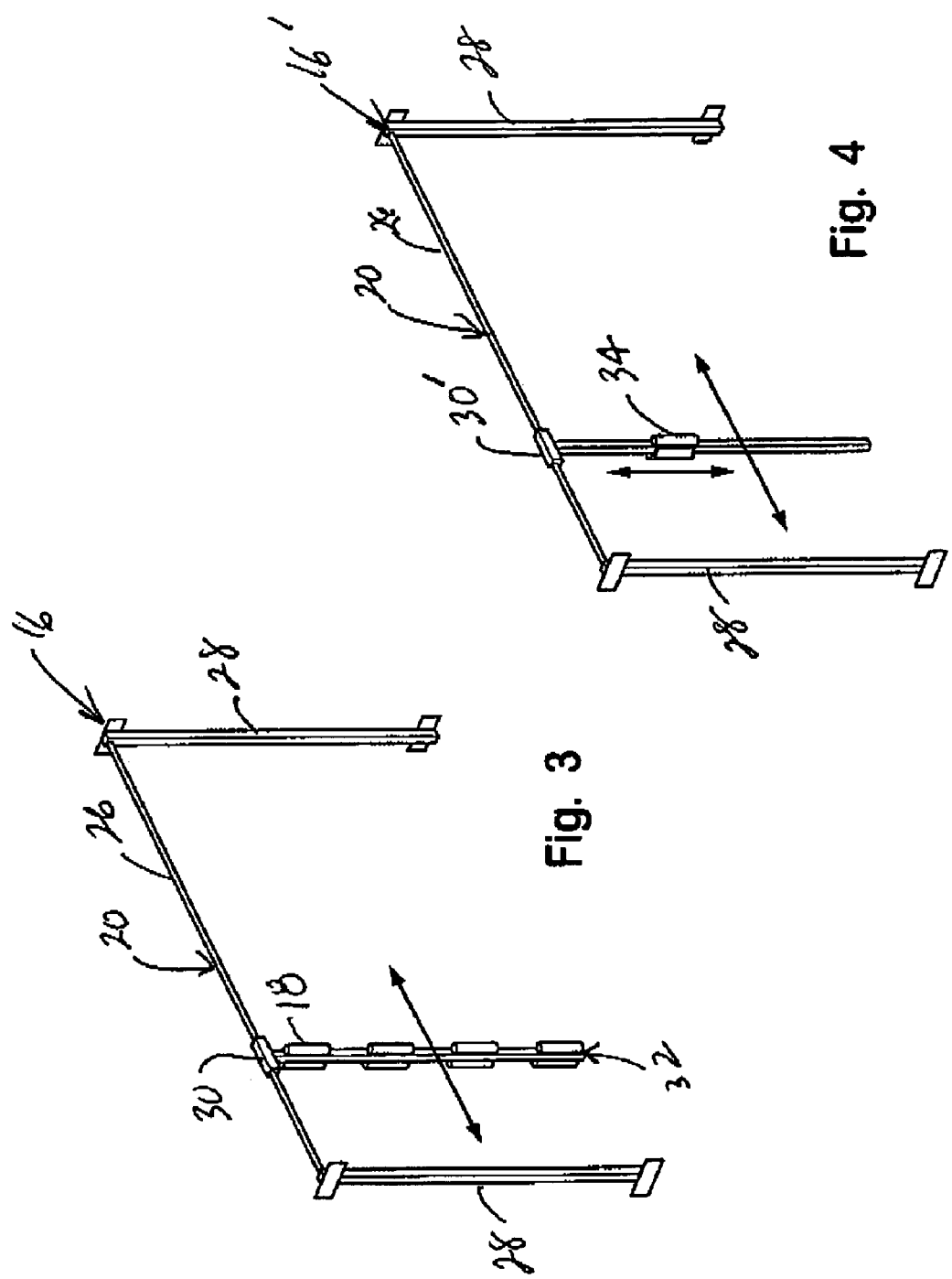

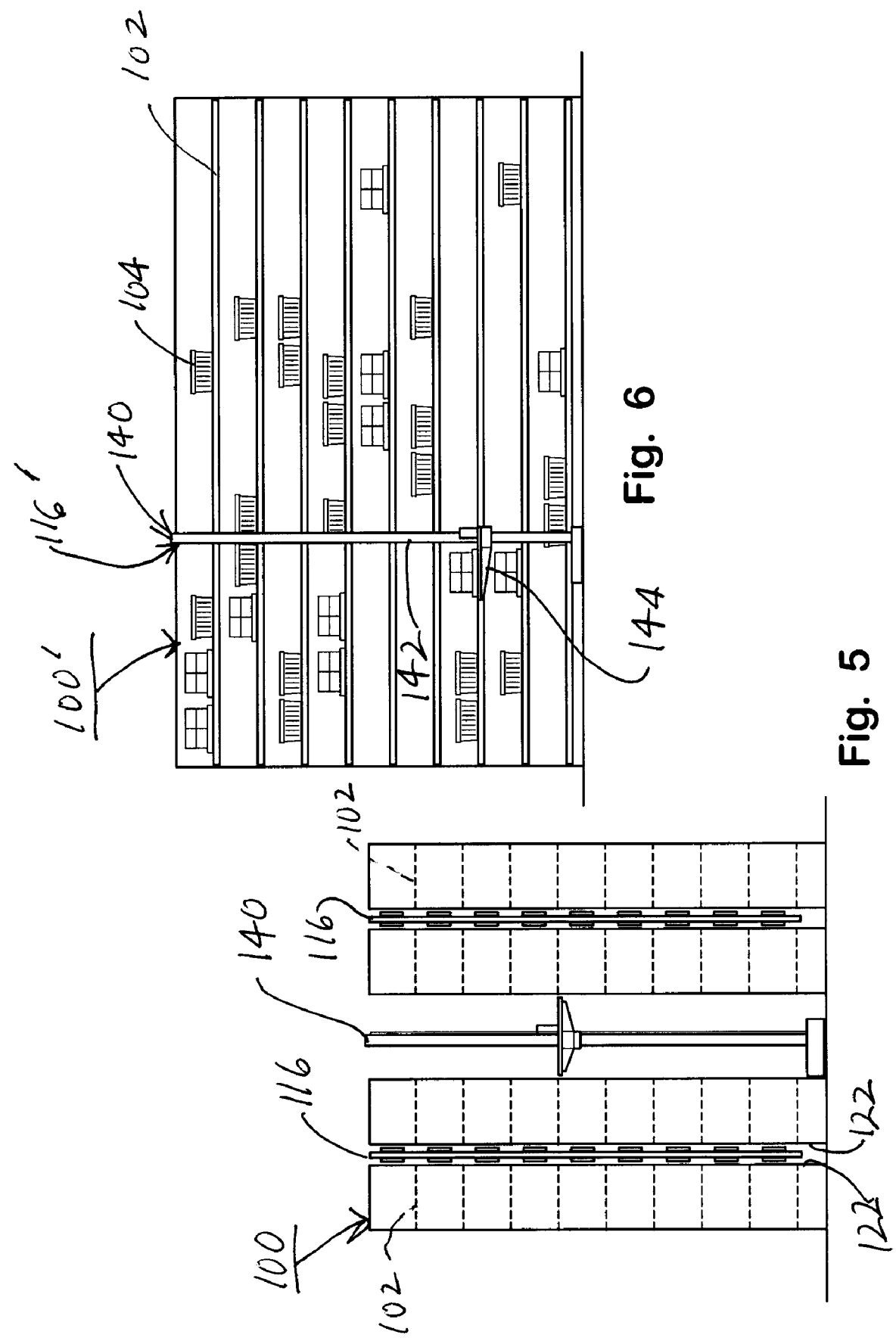

US 7,132,945 B2

MATERIAL SUPPORT SYSTEM FOR SUPPORTING ITEMS HAVING RADIO FREQUENCY IDENTIFICATION (RFID) TAGS

CROSS REFERENCE TO RELATED APPLICATIONS

The present application claims the benefit of U.S. provisional application Ser. No. 60/496,975, filed Aug. 20, 2003, which is hereby incorporated herein by reference in its entity.

BACKGROUND OF INVENTION

The present invention is directed to a material support system for supporting items, such as individual items, for example, items being merchandised at a retail store, or the like. The invention may also be applied to containers of items, such as pallets or totes. The invention is applicable to a retail store merchandising system, namely, a system of retail store shelves, or the like. The invention is also applicable to a warehouse material-handling system, such as an automatic storage and retrieval system, or the like.

Radio frequency identification (RFID) tags are used as a replacement for barcodes. RFID tags are capable of providing significantly greater information than barcodes and are capable of being read irrespective of the orientation of the item bearing the RFID tag. An RFID tag emits radio frequency signals containing information stored on the RFID tag when excited by an RFID reader. RFID readers typically operate to read the RFID tag as an item is transported past the stationary reader. Alternatively, the RFID reader may be a handheld device that is manually scanned past the item bearing the RFID tag.

SUMMARY OF INVENTION

The present invention provides a unique material support system which is capable of scanning RFID tags of a large number of items in the material support system in an automated manner. A material support system, according to an aspect of the invention, is provided for supporting items having RFID tags placed on the items. At least one item support is provided. Each of the at least one item support is adapted to support a horizontal row of items. At least one radio frequency antenna is positioned adjacent the at least one item support. An antenna support system is provided. The antenna support system transports the at least one radio frequency antenna along the horizontal row of items at the at least one item support.

In one illustrated embodiment, the material support system is a retail store merchandising system. The at least one item support is a retail store shelf that is adapted to support individual items, each of the items bearing an RFID tag. Among a variety of functions, this allows the items on a store shelf to be inventoried, thereby maintaining an accurate inventory of the store's merchandise.

In another disclosed embodiment, the material support system is made up of a warehouse material-handling system. The at least one item support may be a row of container supports that are adapted to support multiple item containers. Each of the containers bears an RFID tag. Examples of such containers include totes, pallets, bins, shipping containers, and the like. The material support system in this embodiment may be an automatic storage and retrieval system. Such automatic storage and retrieval system includes a crane. The crane has a naturally traveling mast and a gripper that is vertically traveling along the mast. The at least one radio frequency antenna may be positioned on the crane, such as on the gripper and/or on the mast. In this manner, as the crane travels along a storage rack, the RFID tags of the containers can be scanned. Alternatively, the antenna transport system may be a separate system adjacent the support rack opposite the crane. Other examples are disclosed of application of the invention to warehouse material-handling systems.

These and other objects, advantages and features of this invention will become apparent upon review of the following specification in conjunction with the drawings.

BRIEF DESCRIPTION OF DRAWINGS

FIG. 1 is a perspective view of a material support system, according to the invention;

FIG. 2 is an end elevation of the material support system in FIG. 1;

FIG. 3 is a perspective view of an RFID reading system including a radio frequency antenna array and antenna transport system;

FIG. 4 is the same view as FIG. 3 showing an alternative embodiment thereof;

FIG. 5 is the same view as FIG. 2 of an alternative embodiment of a material support system, according to the invention; and FIG. 6 is a side elevation of an alternative embodiment of a material support system, according to the invention.

DETAILED DESCRIPTION OF THE PREFERRED EMBODIMENT

Referring now specifically to the drawings, and the illustrative embodiments depicted therein, material support system 10 is for supporting items having radio frequency identification (RFID) tags placed on the items. Material support system 10 includes one or more item supports 12 for supporting horizontal rows of items 14 (FIG. 1). Material support system 10 additionally includes an RFID reading system 16 made up of one or more radio frequency (RF) antennas 18 and an antenna transport system 24 transporting the radio frequency antenna(s). In the embodiment illustrated in FIGS. 1–4, item supports 12 are supported by vertical supports 22. The vertical supports 22, for back-to-back item supports 12 are illustrated as being spaced apart, thereby defining a void 24 between the vertical supports. RFID reading system 16 is positioned in void 24. In an alternative embodiment, a void may be defined within the item support and the RFID reading system positioned within the void. This is especially useful for new, rather than retrofit, material support systems.

Antenna transport system 20 in the illustrated embodiment includes a rail 26 which, in the illustrative embodiment, may be an electrified monorail, or the like. Rail 26 may be attached to a vertical support 22 or may be supported by a pair of rail supports 28 or by other conventional supports. Antenna transport system 20 additionally includes a carriage 30 that is propelled along rail 26. In the embodiment illustrated in FIG. 3, a plurality of RF antennas 18 define an antenna array 32.

In operation, in order to read the RFID tags of items 14 on item supports 12, carriage 30 travels along rail 26. This causes each antenna 18 to be momentarily juxtaposed with the items at a particular location on the item support 12. As the carriage 30 moves along rail 26, the RFID tags are read on other items supported by item support 12, within reading range of an antenna 18. This process is repeated until carriage 30 moves the full length of rail 26 thereby having read all of the RFID tags of the items on item supports 12. The number of antennas 18 are selected according to the range of the antenna. The greater the range of the antenna, the fewer the number of antennas are required. Also, the shorter the range of the antenna, the closer the antenna should be aligned with the associated item support 12. Indeed, if the range is sufficient on the antenna, it does not require an antenna for each item support 12. The data obtained by antenna array 32 may be transported to a collecting computer (not shown) utilizing known wireless communication techniques. Alternatively, rail 26 may support conductors which are contacted by carriage 30 as the carriage travels along the rail. Such electrified monorail systems are well known in the art. The electrified monorail system may supply power to a motor in carriage 30 in order to transport the carriage along rail 26. Alternatively, a system of cables and pulleys may be utilized to move carriage 30 from a stationary drive system. Operation of RFID reading system 16 may be under the control of an inventory management system which schedules the operation of the RFID reading system at desired intervals. Because the RFID reading system is positioned out of sight behind the item supports, it may be operated even during normal store hours. This is especially desirable for stores that are open 24 hours a day.

In the embodiment illustrated in FIG. 4, an RFID reading system 16' includes a carriage 30' having one or more movable antennas 34 mounted thereto. Movable antenna 34 may transport vertically along carriage 30 and the carriage 30 is being transported horizontally along rail 26. This allows a fewer number of antennas to be utilized to read the RFID tags of items on all of the item supports 12.

A material support system 100 may be in the form of a warehouse management system. Warehouse management system 100 is made up of a plurality of item supports 102 which support containers, such as totes, shipping containers, pallets, and the like. Each such item 104 bears an RFID tag. Item supports 102 are also known as support racks and may be divided further into a series of individual recesses which are each capable of holding one item 104. Material support system 100 additionally includes a crane 140 for depositing items to and removing items from the item supports 102. Crane 140 includes a mast 142 which travels laterally along item supports 102. Crane 140 additionally includes a gripper assembly 144 which travels vertically along mast 142. As is well known in the art, such system also known as an automatic storage and retrieval system, is capable of storing containers at open positions along the item support 102 and retrieving desired containers from the item support.

As is best seen in FIG. 5, an RFID reading system 116 may be positioned between item supports 102 of a material support system 100. RFID reading system 116 may include the same components as reading systems 16, 16'. Item supports 102 may be supported by vertical supports 122 which may be in the form of individual steel numbers, support plates, or the like. Vertical supports 122 are spaced apart thereby defining a void in which reading system 116 is useable. In this manner, the antenna transport system may move the RF antenna(s) past the items 104 in a similar manner to that previously described.

In an alternative embodiment illustrated in FIG. 6, a material support system 100' includes an RFID reading system 116' in which the antenna transport system is defined by crane 140. In material support system 100', one or more antennas may be positioned on mast 142 and vertically positioned along the mast to read the RFID tags on the associated item support 102. In this manner, as the mast travels along the item supports, the RFID tags will be read. Alternatively, or in addition to, one or more RF antennas may be positioned at gripper assembly 144. This allows an RFID tag of a particular item to be read as when the gripper assembly is juxtaposed with the item. This information may be used in association with information from the linear encoder that identifies the vertical height of the gripper assembly. This may be used to verify the identity of an item that is being retrieved from or stored to the item support 102. Alternatively, it may be used to take an inventory of the items on the transport system 100'. Other applications that may be apparent to the skilled artisan having been apprised of the present invention include the placement of an RF antenna at the forks of a fork truck or at the load support of an automated guided vehicle (AGV). This allows the RFID tag of a load to be read while it is being transported.

Changes and modifications in the specifically described embodiments can be carried out without departing from the principles of the invention which is intended to be limited only by the scope of the appended claims, as interpreted according to the principles of patent law including the doctrine of equivalents.

The invention claimed is:

1. A material support system for supporting items having radio frequency identification (RFID) tags placed on the items, comprising:
 a plurality of item supports, said plurality of item support adapted to support multiple horizontal rows of items:
 at least one radio frequency antenna positioned adjacent said at least one item support;
 an antenna transport system wherein said antenna transport system is adapted to transport said at least one radio frequency antenna along the multiple horizontal rows of items at said plurality of item supports: and
 at least two vertical supports supporting said plurality of item supports, said vertical supports being spaced apart thereby defining a void, wherein said at least one radio frequency antenna being in said void.

2. The system of claim 1 wherein said radio frequency antenna comprises a plurality of antennas positioned adjacent said plurality of item supports.

3. The system of claim 1 wherein said antenna transport system transports said at least one radio frequency antenna horizontally along items on one of said item supports and vertically from one of said item supports to another of said item supports.

4. The system of claim 1 wherein said material support system comprises a retail store merchandising system and wherein said plurality of item supports comprise a plurality of retail store shelves, each adapted to support individual items, each of the items bearing an RFID tag.

5. The system of claim 1 wherein said material support system comprises a warehouse material-handling system and wherein said plurality of item supports comprise a plurality of rows of container supports, each adapted to support multiple-item containers, each of the containers bearing an RFID tag.

6. The system of claim 5 wherein said material support system comprises an automatic storage and retrieval system.

7. A material support system for supporting items having radio frequency identification (RFID) tags placed on the items, comprising:
 at least one item support, each said at least one item support adapted to support a horizontal row of items:

at least one radio frequency antenna positioned adjacent said at least one item support: and an antenna transport system, said transport system transporting said at least one radio frequency antenna along the horizontal row of items at said at least one item support, wherein said transport system comprises a rail system.

8. The system of claim 7 including a void adjacent said at least one item support, wherein said at least one radio frequency antenna being in said void.

9. The system of claim 7 wherein said material support system comprises a retail store merchandising system and wherein said at least one item support comprises at least one retail store shelf adapted to support individual items, each of the items bearing an RFID tag.

10. The system of claim 7 wherein said material support system comprises a warehouse material-handling system and wherein said at least one item support comprises a row of container supports adapted to support multiple-item containers, each of the containers bearing an RFID tag.

11. The system of claim 10 wherein said material support system comprises an automatic storage and retrieval system.

12. The system of claim 7 wherein said rail system comprises a monorail system.

13. A material support system for supporting items having radio frequency identification (RFID) tags placed on the items, comprising:
  at least one item support each said at least one item support adapted to support a horizontal row of items;
  at least one radio frequency antenna positioned adjacent said at least one item support: and
  an antenna transport system, said transport system transporting said at least one radio frequency antenna along the horizontal row of items at said at least one item support;
  wherein said material support system comprises an automatic storage and retrieval system wherein said automatic storage and retrieval system comprises a crane, said crane having a laterally traveling mast and a gripper that is vertically traveling along said mast, wherein said antenna transport system comprises said crane.

14. The system of claim 13 wherein said at least one radio frequency antenna is positioned at said gripper.

15. The system of claim 13 wherein said at least one radio frequency antenna is positioned at said mast.

16. A material support system for supporting items having radio frequency identification (RFID) tags placed on the items, comprising:
  at least one item support, each said at least one item support adapted to support a horizontal row of items:
  at least one radio frequency antenna positioned adjacent said at least one item support; and
  an antenna transport system, said transport system transporting said at least one radio frequency antenna along the horizontal row of items at said at least one item support;
  wherein said material support system comprises an automatic storage and retrieval system;
  wherein said at least one item support comprises a plurality of item supports that are arranged in a vertically and horizontally matrix of container supports, wherein said automatic storage and retrieval system comprises a crane wherein said antenna transport system is adjacent said matrix of container supports opposite said crane.

* * * * *

UNITED STATES PATENT AND TRADEMARK OFFICE
CERTIFICATE OF CORRECTION

PATENT NO. : 7,132,945 B2 Page 1 of 1
APPLICATION NO. : 10/711086
DATED : August 20, 2004
INVENTOR(S) : Joe D. Dunlap, Jr.

It is certified that error appears in the above-identified patent and that said Letters Patent is hereby corrected as shown below:

Column 4:
Line 30, Claim 1, "support" should be --supports--.
Line 31, Claim 1, ":" should be --;--.
Line 37, Claim 1, ":" should be --;--.
Line 67, Claim 7, ":" should be --;--.

Column 5:
Line 2, Claim 7, ":" should be --;--.
Line 28, Claim 13, Insert --,-- after "support".
Line 31, Claim 13, ":" should be --;--.

Column 6:
Line 16, Claim 16, ":" should be --;--.

Signed and Sealed this

Twenty-fourth Day of April, 2007

JON W. DUDAS
*Director of the United States Patent and Trademark Office*

UNITED STATES PATENT AND TRADEMARK OFFICE
CERTIFICATE OF CORRECTION

PATENT NO. : 7,132,945 B2 Page 1 of 1
APPLICATION NO. : 10/711086
DATED : November 7, 2006
INVENTOR(S) : Joe D. Dunlap, Jr.

It is certified that error appears in the above-identified patent and that said Letters Patent is hereby corrected as shown below:

Column 4:
Line 30, Claim 1, "support" should be --supports--.
Line 31, Claim 1, ":" should be --;--.
Line 37, Claim 1, ":" should be --;--.
Line 67, Claim 7, ":" should be --;--.

Column 5:
Line 2, Claim 7, ":" should be --;--.
Line 28, Claim 13, Insert --,-- after "support".
Line 31, Claim 13, ":" should be --;--.

Column 6:
Line 16, Claim 16, ":" should be --;--.

This certificate supersedes Certificate of Correction issued April 24, 2007.

Signed and Sealed this

Twenty-second Day of May, 2007

JON W. DUDAS
*Director of the United States Patent and Trademark Office*